United States Patent [19]
Schroter

[11] 3,798,995
[45] Mar. 26, 1974

[54] BRAKE OPERATING LEVER SYSTEM
[76] Inventor: Hans O. Schroter, Robert Koch Strasse 18, 8 Munich 22, Germany
[22] Filed: Nov. 9, 1972
[21] Appl. No.: 304,974

[52] U.S. Cl..................................... 74/512, 74/518
[51] Int. Cl.............................................. G05g 1/14
[58] Field of Search ............ 74/518, 516, 105, 107, 74/512

[56] References Cited
FOREIGN PATENTS OR APPLICATIONS
1,166,904   6/1958   France................................ 74/516

Primary Examiner—Allan D. Herrmann
Attorney, Agent, or Firm—Edmund M. Jaskiewicz

[57] ABSTRACT

A brake system for a vehicle is provided with a mechanical hydraulic operator including a variable ratio operating lever wherein a rod which displaces a piston of a master cylinder of the hydraulic brake system is pivotally connected to a pivotally mounted control lever. A pivotally mounted operating lever has an external cam surface which engages a roll at the pivotal connection of said rod and control lever to transmit an operating force to the rod. The distance between the pivotal mount and pivotal connection of the control lever is substantially equal to the maximum displacement of the rod in actuating the master cylinder of the brake system. Particular angular relationships between the direction of operating force acting on the control lever and the piston rod, the piston rod and the control lever are provided in order to produce a predetermined variable ratio as the operating lever moves in the braking direction.

6 Claims, 6 Drawing Figures

BRAKE OPERATING LEVER SYSTEM

The present invention relates to a mechanical hydraulic system for operating the brakes of a vehicle, more particular, to such a system having an operating lever which varies the ratio of the travel of the operating lever around its pivot point to the displacement of the piston rod in the main cylinder in a predetermined manner as the operating lever moves in the braking direction.

Motor vehicles have been provided with brake systems operated by a mechanical hydraulic arrangement wherein the hydraulic system is provided with a master cylinder whose piston is displaced by means of a piston rod whose end is pivotally connected to a pivotally mounted control lever. Suitable transmission linkage is provided between the control lever and a pivotally mounted operating lever to transmit the operating force to the rod and thereby to the piston during movement of the operating lever in the braking direction. In the release position, the longitudinal axis of the piston rod defines an angle with the direction of the operating force transmitted from the operating lever to the control lever. During the braking movement, this angle moves progressively into a substantially straight line relationship so that the operating force is transmitted directly along the longitudinal axis of the piston rod.

As a result of extensive tests it has been found that the desired mechanical amplification of the force applied by the foot of the operator can be obtained with a mechanical hydraulic brake operator without any loss of piston displacement in the master cylinder and wherein the force applied by the operator of the vehicle can be accurately and precisely regulated only when certain conditions have been fulfilled. These conditions relate to the relationship or ratio between the travel of the transmission linkage as measured by the travel of the operating lever around its pivot point and the displacement of the piston rod in the main cylinder. To obtain the above desired conditions this ratio must be about 0.4 in the release position, the ratio should then increase to about 1.0 after play in the brake operator has been overcome and the brake shoes are positioned against the brake disks or drums and the ratio must be about 1.4–1.6 when achieving the maximum brake effect in the hydraulic system. As a result of considerable testing and investigation it is known that these desired ratios cannot be obtained with known mechanical hydraulic brake operators. This is partially based upon the fact that when the brakes are properly adjusted the travel of the transmission linkage to overcome the play and to achieve the maximum braking effect generally amounts to about one third - to one half of the total piston travel. It is therefore necessary that the ratio should increase up to about four times of its initial value in this portion of the piston travel. Further, known operators are quite complex in structure and they possess a relatively low mechanical efficiency since the number of parts required to coact against each other produces considerable friction which in turn decreases the mechanical efficiency. Because of this complexity of structure and relatively low mechanical efficiency it is not possible to obtain the larger ratio desired in the latter phase of the braking operation by decreasing the travel in the initial phase of braking operation.

It is therefore the principal object of the present invention to provide a novel and improved mechanical hydraulic brake operator for a brake system.

It is another object of the present invention of providing a mechanical hydraulic brake operator of the type described above which has a simplified structure and which occupies a minimum of space.

It is a further object of the present invention to provide a simple and reliable mechanical hydraulic brake operator which varies the ratio between the travel of transmission linkage and displacement of the hydraulic piston in a predetermined manner to achieve effective braking.

According to one aspect of the present invention there is provided a variable ratio operating lever for the brake system of a vehicle which comprises a rod adapted to actuate the brake system and in case of a hydraulic brake system is operatively connected to displace the piston of the master cylinder. A pivotally mounted control lever is pivotally connected to the rod. A pivotally mounted operating lever is moveable between release and braking positions and produces an operating force which is transmitted by suitable means to the control lever in a direction varying from an angle to substantially a straight line with respect to the longitudinal axis of the rod during the movement of the operating lever in the braking direction. The distance between the pivotal mounting and the pivotal connection of the control lever is substantially equal to the maximum displacement of the rod in actuating the brake system. A first line between the points of engagement of the operating force on the operating and control levers defines an angle of about 165° with a second line between the point of engagement of the operating force on the control lever and the pivot of the control lever. This angle decreases upon the movement of the operating lever in the braking direction. In addition, the longitudinal axis of the rod defines an angle of about 45° with a line between the pivot mount and pivot connection of the control lever in the release position of the operating lever. This angle increases to about 100° as the operating lever moves from its release to its braking position.

In one embodiment of the present invention the piston rod and the operating force transmitted from the operating lever both engage the control lever at a point. This structure is advantageous in that it results in a particularly simple and space-saving structure.

Other objects and advantages of the present invention will be apparent upon reference to the accompanying description when in taken in conjunction with the following drawings, which are exemplary, wherein.

Proceeding next to the drawings wherein like reference symbols indicate the same parts throughout the various views a specific embodiment and modifications of the present invention will be described in detail.

Figure 1:
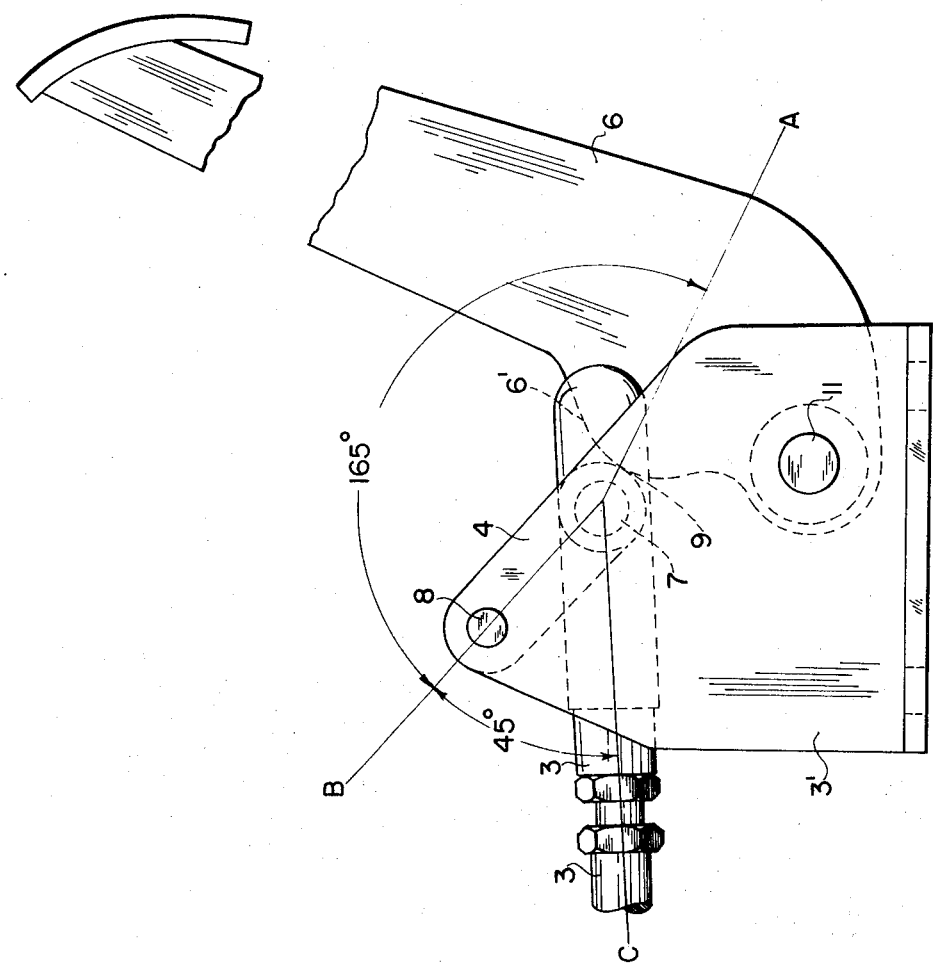
FIG. 1 is a side elevational view of the mechanical hydraulic brake operator according to the present invention in its release position.

The hydraulic brake system of a vehicle has a master cylnder 1 which is illustrated only schematically and comprises a piston 2. The master cylinder is fixedly mounted on the frame of the vehicle. A piston rod 3 has one end in an operative relationship with the piston 2 as may be seen in FIG. 1A and has its other end pivotally connected at 7 to a control lever 4 which is pivotally mounted at 8 in a stationary bracket 3' which is fixed on the frame of the vehicle.

An operating lever 6 which is in a form of a foot pedal is pivotally mounted to the bracket 3' by a pin 11.

The control lever 4 actually comprises two longitudinal arms which are transversely spaced from each other with there being transverse bores on both ends of the control lever. The pin 8 passes through the bores at one end of the lever to pivotally mount the control lever within the bracket 3' and transverse bores are provided in the other ends of the arms to receive the ends of the pin 7 as may be seen in FIG. 2.

Figure 1A:
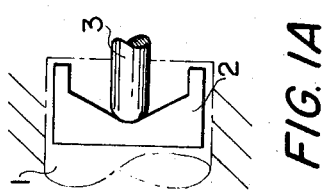
FIG. 1A is a schematic sectional view in enlarged scale showing the engagement of the actuating rod with the piston in the master cylinder.
Figure 2:
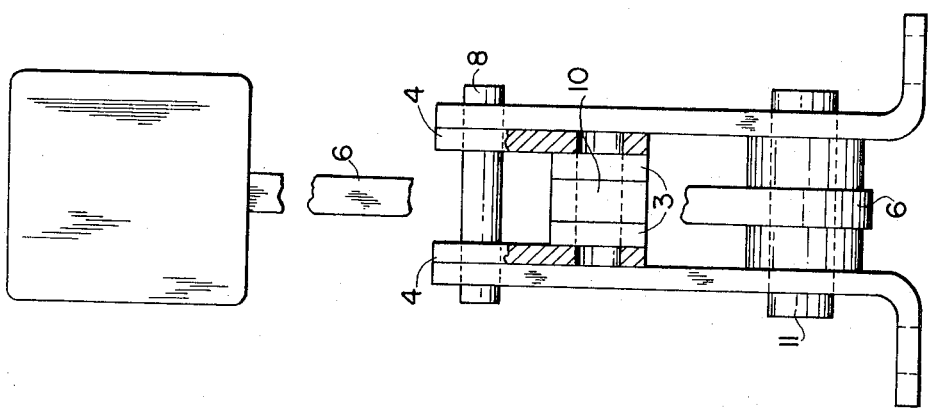
FIG. 2 is a front elevational view of the operator shown in FIG. 1.

The end of the rod 3 which is pivotally connected to the control lever 4 is bifurcated with these bifurcated portions being positioned between the arms of the control lever as shown in FIG. 2 and through which the pin 7 passes. A roller 10 is mounted upon the pin 7 between the bifurcated portions of the rod 3. The roller 10 is acted upon directly at point 9 by an external cam portion 6' formed on an edge of the operating lever 6 as may be seen in FIG. 1. The point 9 represents the contact point between the cam 6' and the roller 10. The cam 6' is so shaped that in the release position as illustrated in FIG. 1 a line A drawn between the point of engagement 9 of the operating force on the operating lever 6 and point of engagement 7 of the operating force on the control lever 4 defines an angle of about 165° with a line drawn between the point of engagement 7 of the operating force on the control lever 4 and its pivot 8. This angle between the lines A and B will decrease as the operating lever 6 moves counterclockwise in the braking direction.

In addition, the length of the control lever 4 is substantially the same as the maximum displacement of the piston 2 in the master cylinder 1.

Further, the longitudinal axis of the rod 3 indicated at C defines an angle of about 45° with the line B which is drawn between the pivot connection 7 of the rod with the control lever 4 and the pivot mount 8 of the control lever. This angle will increase to about 100° during the movement of the operating lever in the braking direction.

As the operator applies the force of his foot to the foot pedal or operating lever 6 to initiate the braking operation the angle of 165° will decrease very rapidly so that the ratio of the travel of the contact point 9 as measured around the pivot 11 to the displacement of the rod 3 will increase from an initial value of about 0.4 up to about 1.0 as any slack or play in the brake system is overcome and the brake shoes are positioned against the brake disks or drums. The maximum braking effect is then immediately attained and this ratio reaches the maximum value of about 1.6 and remains at this value throughout the remaining movement of the operating lever in the braking direction.

Figure 3:
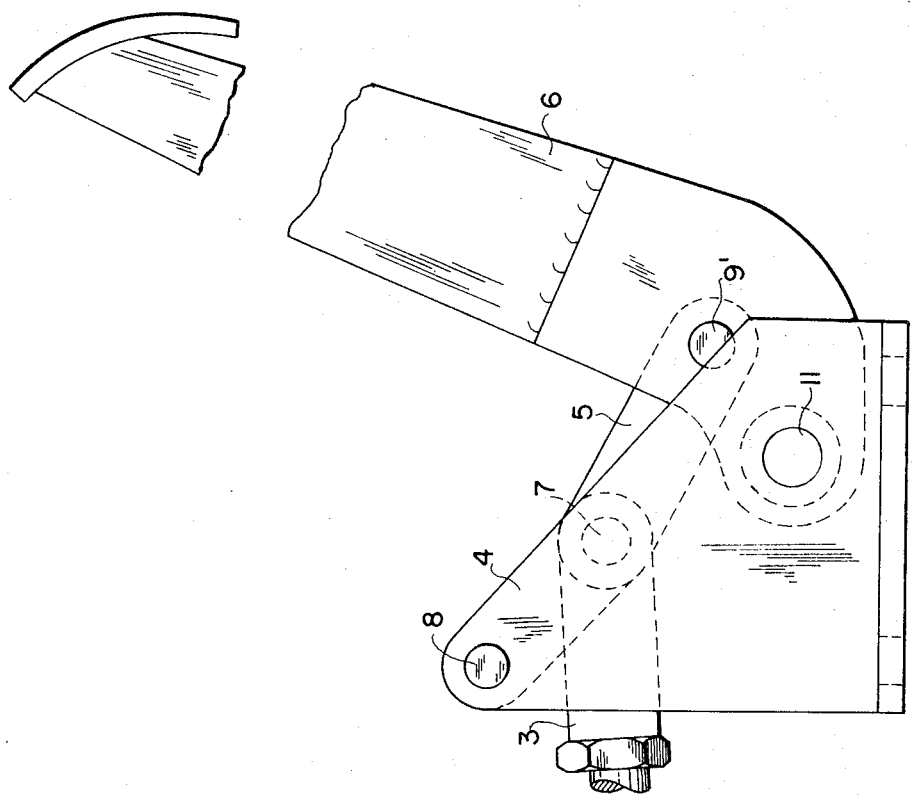
FIG. 3 is a view similar to that of FIG. 1 of a modified operator wherein the operating force is transmitted from the operating lever to the actuating rod by means of a link.
Figure 3A:
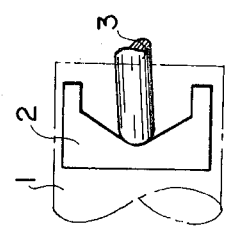
FIG. 3A is a view similar to that of FIG. 1A showing the end of the rod of FIG. 3.
Figure 4:
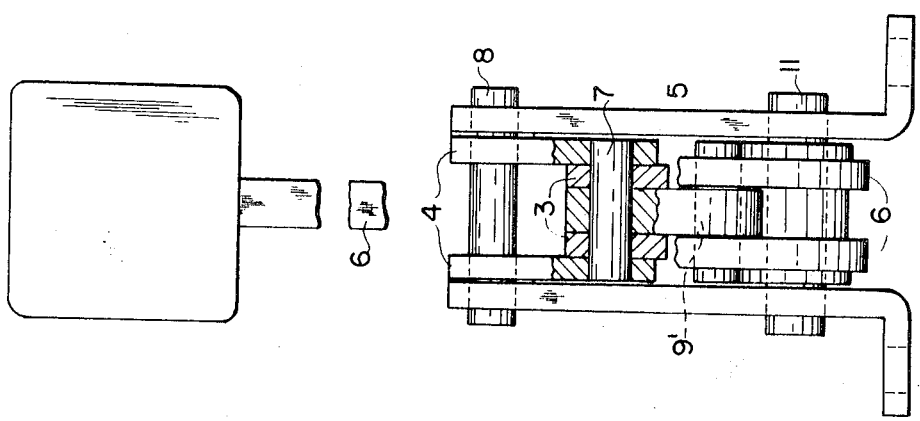
FIG. 4 is a front elevational view of the operator shown in FIG. 3.

As may be seen in the modification of FIGS. 3–4 the roller 10 can be replaced by a single link 5 one end of which is pivotally connected on the pin 7 and the other end pivotally connected to the operating lever 6 by a pin 9'. In this modification the cam 6' is thus eliminated and the operating force is transmitted directly from the operating lever 6 to the rod 3 by means of the transmitting link 5. The above described ratios for the operating distance to the displacement of the piston will also be obtained if the relationships as described above with respect to the control lever 4 and the various angles are present.

It is therefore apparent that by constructing the brake operator in accordance with these angular and dimensional relationships the above described ratios throughout the several successive phases of operation of the brake operator will be obtained. The maximum ratio will remain approximately constant throughout the subsequent movement of the operating lever in the braking direction. In addition, the brake operator disclosed herein provides a very high degree of mechanical efficiency in the mechanical transmission of the operating force to the piston rod of the master cylinder. As a result, the path of movement of the operating lever can be significantly reduced and the major portion of the movement of the operating lever can be used for the high amplification of the operating force throughout the actual application of the braking effect. Further, it is apparent that this operator incorporates a simple and reliable structure which can be readily fabricated with a minimum of expense.

It will be understood that this invention is susceptible to modification in order to adapt it to different usages and conditions, and accordingly, it is desired to comprehend such modifications within this invention as may fall within the scope of the appended claims.

What is claimed is:

1. A variable ratio operating lever for the brake system of a vehicle comprising a rod adapted to actuate the brake system, a pivotally mounted control lever and pivotally connected to said rod, a pivotally mounted operating lever moveable between release and braking positions, means for transmitting an operating force from said operating lever to said control lever in a direction varying from an angle to substantially a straight line with respect to the longitudinal axis of said rod during the movement of the operating lever toward the braking position, the distance between the pivotal mount of the control lever and pivotal connection of said control lever being substantially equal to the maximum displacement of said rod in actuating the brake system, a first line between the points of engagement of the line of the operating force on the operating and control levers defining an angle of about 165° with a second line between the point of engagement of the operating force on said control lever and the pivotal mount of said control lever in the release position of the operating lever which angle decreases upon the movement of the operating lever in the braking direction, the longitudinal axis of said rod defining an angle of about 45° with a third line between the pivot mount of the control lever and pivot connection of said control lever in the release position of the operating lever which angle increases to about 100° upon movement of the operating lever in the braking direction.

2. A variable ratio operating lever as claimed in claim 1 wherein said brake system is hydraulic and said rod is adapted to displace the piston of the master cylinder of the hydraulic brake system.

3. A variable ratio operating lever as claimed in claim 1 wherein said rod and the line of the operating force transmitted by the operating lever engage said control lever at a point thereon.

4. A variable ratio operating lever as claimed in claim 1 wherein said rod has one end pivotally connected to said control lever and a roll on said one end, the other end of said rod is operatively connected to actuate said brake system, said operating force transmitting means comprises an external cam on said operating lever engageable with said roll.

5. A variable ratio operating lever as claimed in claim 4 wherein said rod one end is bifurcated and a pin extends transversely between the bifurcated portions, said roll being mounted on said pin.

6. A variable ratio operating lever as claimed in claim 5 wherein said control lever comprises a pair of laterally spaced longitudinally extending arms, one of the pair of ends of said arms being pivotally mounted upon a frame and the other pair of ends of said arms being pivotally connected to said pin.

* * * * *